United States Patent [19]
Yamana et al.

[11] Patent Number: 6,113,824
[45] Date of Patent: Sep. 5, 2000

[54] PROCESS FOR SURFACE TREATING A FLUORINE-CONTAINING RESIN MOLDED ARTICLE

[75] Inventors: Masayuki Yamana; Tomohiro Isogai, both of Settsu, Japan

[73] Assignee: Daikin Industries, Ltd., Osaka, Japan

[21] Appl. No.: 09/217,982

[22] Filed: Dec. 22, 1998

Related U.S. Application Data

[62] Division of application No. 08/880,067, Jun. 20, 1997, Pat. No. 5,886,090, which is a continuation of application No. 08/525,625, filed as application No. PCT/JP94/00461, Mar. 22, 1994, abandoned.

[51] Int. Cl.[7] ..................................................... C04B 40/00
[52] U.S. Cl. ........................... 264/82; 264/319; 264/345; 427/428; 427/247; 427/344; 427/372.2; 427/384
[58] Field of Search ............................. 525/199; 134/26, 134/25.4, 25.1; 264/82, 319, 345; 427/428, 247, 344, 372.2, 384

[56] References Cited

U.S. PATENT DOCUMENTS

| | | | |
|---|---|---|---|
| 4,155,826 | 5/1979 | Naki et al. | 204/192 |
| 4,179,601 | 12/1979 | Tarumi et al. | 219/216 |
| 4,434,355 | 2/1984 | Inagaki et al. | 219/216 |
| 4,624,990 | 11/1986 | Lunk et al. | 525/199 |
| 4,650,833 | 3/1987 | Sakagami et al. | 525/356 |
| 4,680,060 | 7/1987 | Gupta et al. | 134/21 |
| 4,819,020 | 4/1989 | Matsushiro et al. | 355/3 |
| 4,935,785 | 6/1990 | Wildi et al. | 355/290 |
| 5,639,549 | 6/1997 | Fukunaga et al. | 428/379 |
| 5,725,953 | 3/1998 | Ohishi et al. | 428/383 |
| 5,750,257 | 5/1998 | Doshita et al. | 428/379 |
| 5,804,309 | 9/1998 | Itoh et al. | 428/375 |

FOREIGN PATENT DOCUMENTS

| | | |
|---|---|---|
| 0116499 | 1/1983 | European Pat. Off. . |
| 0116499 | 8/1984 | European Pat. Off. . |
| 0157180 | 10/1985 | European Pat. Off. . |
| 0312077 | 4/1989 | European Pat. Off. . |
| 312077 | 4/1989 | European Pat. Off. . |
| 0420141 | 4/1991 | European Pat. Off. . |
| 62-283373 | 12/1987 | Japan . |
| 64-17080 | 1/1989 | Japan . |
| 4-258640 | 9/1992 | Japan . |

OTHER PUBLICATIONS

International Search Report for International Application No. PCT/JP94/00461 mailed Jun. 28, 1994.
Supplementary European Search Report for Application No. EP 94 91 0521 mailed Mar. 21, 1996.

*Primary Examiner*—Merrick Dixon
*Attorney, Agent, or Firm*—Varndell & Varndell, PLLC

[57] ABSTRACT

Fluorine-containing resin molded article including a molded article of a fluorine-containing resin composition containing 0.1 to 30% by weight of a carbon material, a surface of said molded article being fluorinated. The fluorine-containing resin molded article can be obtained by, after preparing molded article of a fluorine-containing resin composition containing 0.1 to 30% by weight of a carbon material, fluorinating the surface of the article with a reaction gas which comprises a compound containing fluorine atom. This fluorine-containing resin molded article has an antistatic property and non-tackiness.

5 Claims, No Drawings

PROCESS FOR SURFACE TREATING A FLUORINE-CONTAINING RESIN MOLDED ARTICLE

CROSS-REFERENCES TO RELATED APPLICATIONS

This application is a divisional application of U.S. Ser. No. 08/880,067, filed Jun. 20, 1997 now U.S. Pat. No. 5,886,090, which is a continuation of U.S. Ser. No. 08/525,625, filed Sep. 22, 1995, now abandoned, which is a PCT U.S. national phase application of international application PCT/JP94/00461 filed Mar. 22, 1994.

TECHNICAL FIELD

The present invention relates to a fluorine-containing resin molded article having an excellent antistatic property and non-tackiness and to a process for preparation of the same.

The present invention also relates to a fixing roller for an electrostatic copying machine having a high toner-offset-preventing ability, which comprises the provision of a sheet or film of a fluorine-containing resin composition on the outer surface of a metal roller.

BACKGROUND ART

Fluorine-containing resins such as homopolymer or copolymers of tetrafluoroethylene have a very low surface energy in comparison with other resins, and therefore have an extremely superior surface properties such as water- and oil-repelling property, non-tackiness and mold-releasing property. In addition, it has been known that because of their chemical stability, they have many excellent properties such as chemical resistance, corrosion resistance and heat resistance, and thus the fluorine-containing resins have been applied to wide and various fields.

The fluorine-containing resins, however, have problems that they are easy to be electrostatically charged, because they are electrically insulative.

For example, in computer devices and various office automation (O.A.) machines, electronic parts such as IC and LSI and magnetic storages must be protected from electrostatic charge and sparks due to the charge. Therefore, for the parts to be used for their peripheral equipments or business machines (e.g. bearing parts for various rollers and transferring machines) are required a sufficient antistatic property.

Further, for a reservoir of chemicals and an equipment used in preparation process of semiconductors, but for a sufficient antistatic property, not only the elements are broken due to the electrostatic charge, but also the maintenance of clean environment is obstructed.

Moreover, a fluorine-containing resin film is used as an offset-preventing layer for the surface of a fixing roller in a heat roller fixing equipment of electrostatic copying machines. In this case, when using the fluorine-containing resin alone, though non-tackiness and mold-releasing property to a toner melted by heating (hereinafter referred to as "hot-offset-preventing effect") are sufficient, there arises the problem of a phenomenon so-called electrostatic offset, that is, due to the abrasion between the fixing roller and paper sheets the offset-preventing layer of the fluorine-containing resin is charged gradually, and then the toner before fixing is electrostatically adsorbed or repelled, which results in blotting and missing in electrostatic images.

Further, in view of saving energy and shortening a warm-up time of machines it is desired to carry out the fixing at a temperature as low as possible. For this purpose, a fixing roller having an excellent heat conductivity is desired. Accordingly, it is required that the offset-preventing layer is made as thinner as possible and also has abrasion resistance together with the above various properties.

In order to solve the above problems, there has been proposed a composition of a fluorine-containing resin with which various electrically conductive fillers are blended.

For example, JP-B-38302/1991 discloses a fluorine-containing resin composition to which a carbon black is added as the electrically conductive filler. When adding the electrically conductive carbon black to the fluorine-containing resin, the composition is endowed with an electric conductivity and thus an excellent antistatic ability can be achieved. However, since the electrically conductive carbon black has a larger surface energy than the fluorine-containing resin, the carbon black is inferior to the fluorine-containing resin in such properties as water- and oil-repelling property, non-tackiness and mold-releasing property. Accordingly, the composition of the fluorine-containing resin and the electrically conductive carbon black has the problem that the composition is inferior to the fluorine-containing resin used alone in such properties as water- and oil-repelling, non-tackiness and mold-releasing property, and therefore such a composition has been practically used within the limited use.

To the offset-preventing layer of the fixing roller, it has been also tried to add various electrically conductive fillers.

For example, JP-B-23626/1983 proposes the use of a resin layer containing a carbon black and the like as the offset-preventing layer. When an addition amount of carbon black is made larger, a volume specific resistivity can be lowered, which results in improvement of electrostatic offset-preventing effect. However, the hot offset-preventing effect becomes bad. In order to solve this dilemma, in the practical application there is obliged to use a wet process in which a silicone oil is applied to the surface of the fixing roller.

JP-B-59468/1990 proposes the addition of a carbon fluoride to a fluorine-containing resin together with a carbon fiber as the electrically conductive filler in order to compensate the hot offset-preventing effect. In this case, though the both offsets, i.e. hot-offset and electrostatic-offset can be prevented, it is difficult to form uniformly an offset-preventing layer containing the two fillers. When the surface of the offset-preventing layer is uneven, it is impossible to maintain the offset-preventing effect for a long time.

As explained above, in the practical situation, it is difficult to prepare a fluorine-containing resin molded article which has a uniform surface and is simultaneously sufficient in both of antistatic ability and non-tackiness.

The present invention has been made on the basis of those problems, and has an object to provide a fluorine-containing resin molded article with an excellent antistatic ability and non-tackiness due to its proper electric conductivity and sufficiently low surface energy.

Another object of the present invention is to provide a novel process for preparing a fluorine-containing resin molded article with an antistatic ability and non-tackiness.

Further object of the present invention is to provide a fixing roller for electrostatic copying machine having a high offset-preventing ability, and to provide a preparation process of the same.

DISCLOSURE OF THE INVENTION

The present invention relates to a fluorine-containing resin molded article, comprising a molded article of a fluorine-containing resin composition containing 0.1 to 30% by weight of a carbon material, a surface of said molded article being fluorinated.

BEST MODE FOR CARRYING OUT THE INVENTION

In the present invention, the fluorine-containing resin is used as a matrix. Examples of the fluorine-containing resin are, for instance, polytetrafluoroethylene, a copolymer of tetrafluoroethylene with at least one of other copolymerizable ethylenically unsaturated monomers (for example, olefins such as ethylene and propylene, halogenated olefins such as hexafluoropropylene, vinylidene fluoride, chlorotrifluoroethylene and vinyl fluoride, perfluoro(alkyl vinyl ethers), and the like), polychlorotrifluoroethylene, poly (vinylidene fluoride), and the like. The particularly preferable fluorine-containing resin among them is polytetrafluoroethylene, a copolymer of tetrafluoroethylene with at least one of hexafluoropropylene, perfluoro(methyl vinyl ether) and perfluoro(propyl vinyl ether) (which is contained in an amount of not more than 40% by mole to tetrafluoroethylene), and the like. Also, the fluorine-containing resin may be used in a mixture of two or more as well as used alone. Particularly preferable mixture is a mixture of polytetrafluoroethylene and a copolymer of tetrafluoroethylene with perfluoro(alkyl vinyl ether), and the like.

In the present invention, the carbon material is added as an electrically conductive filler. Examples of the carbon material are, for instance, carbon black, graphite powder, carbon fiber, spherical glass-like carbon, meso-carbon microbeads, and the like. If necessary, these may be heat-treated at 1,000° C. to 3,000° C. Particularly preferable carbon material is a carbon black which is classified as the electrically conductive carbon black. For example, there may be used Ketjen Black EC (tradename) and Ketjen Black EC-600 JD (tradename) from LION-AKZO, VULCAN XC-72 (tradename) and Black Pearls 2000 (tradename) from Cabot Corporation, HS-500 (tradename) from Asahi Carbon, Denka Black (tradename) from Denki Kagaku Kogyo, and the like.

An amount of the carbon material to be added to the fluorine-containing resin is properly 0.1 to 30% by weight. When less than 0.1% by weight, a sufficient electric conductivity cannot be obtained, and when more than 30% by weight, the abrasion resistance undesirably becomes worse and the mechanical strength becomes lowered.

In the present invention, the fluorine-containing resin molded article can be produced by preparing a molded article of a fluorine-containing resin composition containing 0.1 to 30% by weight of the carbon material, and then fluorination-treating the surface of the article with a reaction gas of a compound containing fluorine atom. The molded article is prepared in the shape of rod, block, board, cup, cylinder, sheet, film, and the like.

A process for preparing a molded article having a desired shape by mixing the fluorine-containing resin and the carbon material is not particularly limited, and an adequate process can be optionally employed depending on the materials.

For instance, as a process for preparing a cup-like or cylindrical molded article there may be employed a process in which after mixing with agitation the fluorine-containing resin powder and the carbon material powder, the mixed powder is press-molded and heat-treated; a process in which the mixed powder is melted and is subjected to injection molding, and the like. As a process for preparing a sheet or film, there may be employed a process in which the fluorine-containing resin and the carbon material are dispersed into an aqueous solution to which a surfactant and the like is optionally added, and the dispersion is applied in wet system on a proper substrate, then dried and heat-treated; a process in which a composite fine particle mateial is prepared from the florine-containing resin and the carbon material and is subjected to powder coating, then heat-treated to form a film, and the like. In any molding process, after the molding, a certain process step such as washing or polishing may be added, if necessary.

In the present invention, the reaction gas comprising a compound containing fluorine atom (hereinafter referred to as "fluorine-containing reaction gas") which is used in the fluorination treatment is, for instance, fluorine gas, nitrogen trifluoride gas, chlorine trifluoride gas or sulfur tetrafluoride gas, and these gases may be optionally diluted with an inert gas such as nitrogen gas. In addition, those gases may be used in an admixture, and if necessary, oxygen gas, steam or hydrogen fluoride gas may be added thereto.

The temperature of the fluorination treatment varies with kinds of the reaction gases, kinds of the fluorine-containing resins, kinds of the carbon materials, and form, thickness or composition of the molded articles or films, and is in the proper range from 50° to 350° C., particularly from 100° to 250° C. A proper treating time is from 1 minute to 5 hours, particularly from 30 minutes to 2 hours. When the treating temperature is lower than 50° C., the reaction which produces C—F bond cannot substantially proceed by the fluorination treatment with the fluorine-containing reaction gas, and thus an effective treatment is impossible. When higher than 350° C., the fluorine-containing resin is deformed and thermally decomposed as well as a degree of fluorination tends to become excess and an electric resistance tends to be larger, which results in inconvenience.

The degree of fluorination treatment is determined by a degree of fluorination at the surface. In the present invention, the degree of surface fluorination is defined by the value measured by the following manner.

$F_{1S}$ spectrum (880 to 700 eV) and $C_{1S}$ spectrum (280 to 300 eV) of a fluorine-containing resin molded article are measured with X ray photoelectron spectrometer (ESCA-750 of Shimadzu Corporation). From a ratio of areas in the charts corresponding to each spectrum, a ratio F/C of the number of fluorine atoms to the number of carbon atoms at the surface of the carbon fluoride particle is calculated. This value is the degree of surface fluorination. A value of the degree of surface fluorination varies with kinds of the fluorine-containing resins used, and is properly from around 1.0 to 3.0, particularly around 2.0 to 3.0.

Since the surface of the fluorine-containing resin molded article is subjected to the fluorination treatment, the molded article has an enriched surface lubricity and is excellent in abrasion resistance.

Prior to the above-mentioned fluorination treatment by using the fluorine-containing reaction gas, according to the present invention, at least the surface of the molded article can be subjected to pre-oxidation treatment.

As the pre-oxidation in the present invention, there may be employed gas-phase oxidation method, liquid-phase oxidation method or electrolytic oxidation method.

According to the gas-phase oxidation method, for example, a gas such as oxygen gas, ozone, nitrogen oxide or steam is contacted with the surface of the molded article or film at a temperature within the preferred range of 100° to 350° C. A reaction temperature varies with kinds of the gases, concentrations of the gases, kinds of the fluorine-containing resins, kinds of the carbon materials, or form, thickness or composition of the molded articles or films, and properly is 100° to 350° C. When lower than 100° C., the pre-oxidation gives an insufficient effect, and when higher than 350° C. the fluorine-containing resin is inconveniently deformed or thermally decomposed.

According to the liquid-phase oxidation method, for example, the molded article or film is dipped in a chemical solution of nitric acid, permanganate/sulfuric acid, a chromate, a hypochlorite, or the like.

In the liquid-phase oxidation method, when using, for example, a concentrated sulfuric acid, the method is feasible by boiling for 0.5 to 6 hours.

According to the electrolytic oxidation method, the molded article or film to be treated is set as a cathode in 1 N sulfuric acid solution, and a direct voltage of 1 to 50 V is applied thereto.

Among them, the gas-phase oxidation method is particularly preferable, because the method can be carried out in the same reactor as for the fluorination treatment to be conducted afterwards, which can simplify the process steps, and further remarkable effects can be obtained.

When the conditions of the fluorination treatment are optimized, the molded article comprising the fluorine-containing resin and the carbon material can be fluorinated only at the surface layer, and the inner part can be maintained in non-fluorinated state.

In the fluorinated surface layer, an extremely excellent low surface energy can be exhibited, because the carbon material is converted into the carbon fluoride at its surface. Therefore, improvement of water- and oil-repelling property, mold-releasing property and non-tackiness can be accomplished in comparison with the sole use of the fluorine-containing resin. In addition, lubricity and abrasion resistance are improved. In general, it is known that a fluorine-containing resin contains terminal structures derived from an initiator or a chain transfer agent which are used in polymerization. For example, in many cases the resin has the end groups such as —COOH end goup and —CONH$_2$ end group, and those groups are polar group which is a factor to make a surface energy of the fluorine-containing resin larger.

JP-A-25008/1991 discloses that those polar end groups can be converted into —CF$_3$ by treating with fluorine gas.

According to the present invention, since only in the surface layer those polar end groups are converted into —CF$_3$ end group by the fluorination treatment, the surface energy can be synergistically lowered together with the production of the carbon fluoride, and thus a molded article having an extremely superior water- and oil-repelling property, mold-releasing property and non-tackiness.

On the other hand, since the electrically conductive carbon material is converted into the insulative carbon fluoride by the fluorination treatment, there is anxiety that the electric conductivity of the molded article becomes lower. However, since only the very limited area of the surface layer is subjected to the fluorination treatment, the increase in volume specific resistivity is very little. As a result, the molded article which can satisfy both the electric conductivity and non-tackiness can be obtained.

Further, when the oxidation treatment is carried out prior to the fluorination treatment, the fluorination treatment can be carried out under gentle conditions and uniformly, which can prevent the molded article from deforming and being rough.

With respect to this effect, though details are not known, the reasons are assumed as follows. Namely, it is said that an oxidized graphite prepared by oxidizing a carbon material is fluorinated at a temperature lower than that of fluorination treatment of the original carbon material to produce a fluorinated graphite (carbon fluoride) (e.g. Summary of Symposium in 15th Fluorine Chemistry, pp. 16–17, 1990). Accordingly, in the present invention, the surface or whole of the carbon material has an oxidized graphite-like structure by the oxidation treatment, and the fluorination can be carried out under more gentle conditions.

In another aspect, it is known that an anode effect which is obtained by coating a surface of carbon electrode with a carbon fluoride film in fluorine generating electrolysis, can scarcely be obtained in the absence of water, but can easily be obtained in the presence of a trace amount of water (e.g. Journal of Fluorine Chemistry, Vol. 57, pp. 83–91(1992)). It is assumed that this phenomenon shows the fact that the trace amount of water or the atomic oxygen produced by the electrolytic oxidation can assist the production of the carbon fluoride film. Therefore, in the fluorination treatment of the present invention, it is assumed that the production of carbon fluoride is accelerated by the oxidation treatment such as steam treatment prior to the fluorination treatment.

With respect to the fluorine-containing resin, when the oxidation treatment such as steam treatment is carried out prior to the fluorination treatment, the polar end groups can be more easily converted into —CF$_3$ end group. Namely, as mentioned above, it is known that the polymer end of the fluorine-containing resin has various structures, and in some cases the end group is —COF. This —COF end group is difficult to be converted into —CH$_3$ end group by simply being subjected to the fluorination treatment with fluorine gas, and severe reaction conditions and a longer reaction time are required. According to the steam treatment, however, the —COF end group can easily be converted into —COOH end group, and the —COOH end group can easily be converted into —CF$_3$ end group by the treatment with fluorine gas.

Therefore, the oxidation treatment is effective to the fluorination of the end groups of the fluorine-containing resin.

As mentioned above, by carrying out the oxidation treatment with steam or proper oxidizing agents prior to the fluorination treatment, the fluorination treatment can be carried out effectively under more gentle conditions. This is relating to modification of both the fluorine-containing resin and the carbon material. By such mutual effects, the fluorine-containing resin molded article having an excellent electric conductivity and non-tackiness can be effectively obtained.

The fluorine-containing resin molded article of the present invention is used for rollers of an electrostatic copying machine such as a fixing roller, a transferring roller, a paper feeding roller and a conveying roller; bearings thereof. Further, the molded article can be applied for various uses, e.g. a reservoir or tray for chemicals used in semiconductor preparation process, a casing for conveying or keeping wafers and electronic parts such as IC, a heating element, an electromagnetic wave shielding material, and the like.

For example, when the above-mentioned fluorine-containing resin film is formed on an outer surface of a metal roller, the obtained roller is a fixing roller for an electrostatic copying machine having a very excellent offset-preventing effect.

That is, the present invention relates to a fixing roller for an electrostatic copying machine, comprising a metal roller on which outer surface is provided with a sheet or film which is prepared by fluorinating a surface of a molded article of a fluorine-containing resin composition comprising 0.1 to 30% by weight of carbon material.

The metal roller of the fixing roller according to the present invention may be made of materials having an excellent heat conductivity and dimension stability as well as being light, e,g, aluminium or stainless steel.

The fluorine-containing resin in the fixing roller according to the present invention is the same as mentioned above, and is particularly preferably a copolymer of tetrafluoroethylene and perfluoro(alkyl vinyl ether), or a mixture of polytetrafluoroethylene and a copolymer of tetrafluoroethylene and perfluoro(alkyl vinyl ether).

The offset-preventing layer in the fixing roller according to the present invention may be formed by usual known methods in which a fluorine-containing resin layer containing a carbon material is used as the offset-preventing layer. Among them, in view of easiness, there is properly employed a method in which a mixed dispersion of the fluorine-containing resin and the carbon material is applied to the surface of the metal roller, dried and then sintered. After the film formation, it is possible to increase a surface roughness by sanding.

The fixing roller of the present invention is produced by, after the formation of the offset-preventing layer, carrying out the fluorination treatment according to the above-mentioned method. Prior to the fluorination treatment, when the above-mentioned steam treatment or oxidation treatment is carried out, the fixing roller can exhibit more excellent offset-preventing abilty.

The present invention is explained below on the basis of Examples, and the present invention is not limited to the Examples.

EXAMPLE 1

Molding pellets were prepared by mixing uniformly 20 parts by weight of a pitch-type carbon fiber (M-107T from Kureha Chemical Co., Ltd., fiber length: 700 $\mu$m, aspect ratio: 39) and 80 parts by weight of tetrafluoroethylene/perfluoro(alkyl vinyl ether) copolymer (PFA) powder (Neoflon PFA AP210 from Daikin Industries, Ltd.) with Henshel mixer, and then melting and kneading at 350° to 370° C. by a biaxial extruder with two screws rotating in a different direction.

The obtained pellets were fed to an injection molding machine (cylinder temperature: 350° to 380° C., die temperature: 180° C.) to prepare a disc-like test piece (diameter: 12 cm, thickness 0.5 cm) by injection molding.

A reactor of monel (capacity: 1.5 liters) was charged with the obtained test piece and sealed, and then a pressure was reduced to 1 Pa or lower by a vacuum pump. After heating the reactor to 200° C., a high purity nitrogen gas was passed though at 1 l/min for one hour to sufficiently dry the test piece, and then the fluorination treatment was carried out by passing a 20% fluorine gas diluted with nitrogen gas at 1 l/min at 200° C. for 2 hours. Immediately after the completion of the fluorination treatment, while passing a high purity nitrogen gas at 1 l/min, the test piece was cooled to room temperature and then taken out.

With respect to the test piece, a contact angle to water and a volume specific resistivity (measured by using R8340A Digital Superhigh Resistivity Meter and R12702A Resistivity Chamber available from Kabushiki Kaisha Advantest) were measured. The results are shown in Table 1.

EXAMPLE 2

A disc-like test piece of the PFA resin containing the pitch-type carbon fiber as a filler was prepared in the same manner as in Example 1.

This test piece was sealed in a reactor of monel (capacity: 1.5 liters), and a temperature was raised to 200° C. with passing a high purity nitrogen gas at 1 l/min.

Subsequently, while maintaining a temperature of he reactor at 200° C., a nitrogen gas containing steam was passed through the reactor at 1 l/min to previously oxidize the test piece, an amount of said steam in the nitrogen gas being equal to the saturated amount at 30° C.

After that, the fluorination treatment was carried out by passing a 20% fluorine gas diluted with nitrogen gas at 1 l/min at 200° C. for one hour. Immediately after the completion of the fluorination treatment, while passing a high purity nitrogen gas at 1 l/min, the test piece was cooled to room temperature and taken out.

The obtained test piece was evaluated in the same manner as in Example 1. The results are also shown in Table 1.

COMPARATIVE EXAMPLE 1

Evaluation of the contact angle to water and the volume specific resistivity was carried out in the same manner as in Example 1 with respect to the test piece of the PFA resin containing the pitch-type carbon fiber as a filler, which was prepared in Example 1 but was not subjected to the subsequent treatments such as the fluorination treatment. The results are shown in Table 1.

COMPARATIVE EXAMPLE 2

A test piece was prepared in the same manner as in Example 1 except that 15 parts by weight of the pitch-type carbon fiber and 5 parts by weight of a carbon fluoride (CFGL from Daikin Industries, Ltd.) were used instead of 20 parts by weight of the pitch-type carbon fiber and that the fluorination treatment was not carried out. The evaluation was conducted in the same manner as in Example 1. The results are shown in Table 1.

TABLE 1

|  | Contact angle to water (degree) | Volume specific resistivity ($\Omega \cdot$ cm) |
| --- | --- | --- |
| Ex. 1 | 136 | $4 \times 10^9$ |
| Ex. 2 | 141 | $5 \times 10^8$ |
| Com. Ex. 1 | 123 | $2 \times 10^7$ |
| Com. Ex. 2 | 125 | $3 \times 10^9$ |

EXAMPLE 3

To a PFA resin solution (Polyfulon Dispersion AD-1CR from Daikin Industries, Ltd.) was added an electrically conductive carbon (Ketjen Black EC from LION AKZO) in an amount of 20% by weight to the solid content of the PFA resin solution, and sufficiently mixed and dispersed by means of an ultrasonic homogenizer.

A surface of an aluminium roller (outer diameter: 50 mm, inner diameter: 44 mm, length: 350 mm) was roughened by means of sandblast treatment, and thereto the above mixed dispersion was applied uniformly by air-spraying, and then the roller was subjected to heat treatment in a hot-air circulation type thermostatic oven of 380° C. for one hour.

Subsequently, the aluminium roller was put in a reactor of monel (capacity: 10 liters) and then sealed, and a high purity nitrogen gas was passed therethrough at 5 l/min for one hour, then the reactor temperature was raised to 200° C. After the temperature reached the equilibrium state, the fluorination treatment was carried out by passing a 20% fluorine gas diluted with nitrogen gas at 2 l/min at 200° C. for 2 hours. Immediately after the completion of the fluorination treatment, while passing a high purity nitrogen gas at 5 l/min, the aluminium roller was cooled to room temperature and taken out.

A fixing portion of electrostatic copying machine was equipped with this roller, and properties of the roller were evaluated with respect to non-offset region property, charging property at paper passing and abrasion resistance.

The non-offset region property was measured by actually passing four sheets of paper of A4 size while changing a temperature of the heated fixing roller in 10° C. steps. The results were evaluated by observing with naked eyes as to whether missing or bleeding of letters occurred or not, and are shown by a temperature region where no offset occurred.

The charging property at paper passing was evaluated by measuring a surface potential of the fixing roller upon the above-mentioned paper-passing test by means of a vibration reed-type surface potentiometer (340 HV from Treck Japan).

The abrasion resistance was evaluated by measuring an abrasion amount (reduced amount: μm) after passing fifty thousand sheets of paper of A4 size.

EXAMPLE 4

An aluminium roller coated with the PFA film containing the electrically conductive carbon was prepared in the same manner as in Example 3.

The aluminium roller was put in a reactor of monel (capacity: 10 liters) and then sealed, and a high purity nitrogen gas was passed therethrough at 5 l/min, then the reactor temperature was raised to 200° C. Subsequently, while maintaining a temperature of the reactor at 200° C., a nitrogen gas containing steam was passed through the reactor at 2 l/min to previously oxidize, an amount of said steam in the nitrogen gas being equal to the saturated amount at 30° C.

After that, the fluorination treatment was carried out by passing a 20% fluorine gas diluted with nitrogen gas at 1 l/min at 200° C. for one hour. Immediately after the completion of the fluorination treatment, while passing a highly pure nitrogen gas at 2 l/min, the roller was cooled to room temperature and taken out.

The obtained roller was evalulated in the same manner as in Example 3. The results are shown in Table 2.

COMPARATIVE EXAMPLE 3

The same evaluation as in Example 3 was conducted with respect to the aluminium roller coated with the PEA film containing the electrically conductive carbon prepared in Example 3 which was not subjected to the subsquent treatments such as the fluorination treatment. The results are shown in Table 2. This roller has a smallest charging potential because the electrically conductive carbon is contained. However, since the surface energy is larger than that of the PFA alone, the hot-offset easily occurs and the non-offset region becomes narrower.

COMPARATIVE EXAMPLE 4

A roller was prepared in the same manner as in Example 3 except that, instead of the electrically conductive carbon, the pitch-type carbon fiber (the same as used in Example 1) and the carbon fluoride (the same as used in Comparative Example 3) were added in amounts of 15% by weight and 5% by weight to the solid content of the PFA resin solution, respectively, and that the fluorination treatment was not carried out. The evaluation was conducted in the same manner as in Example 3. The results are shown in Table 2.

TABLE 2

|  | Non-offset region | Charging potential | Abrasion amount |
| --- | --- | --- | --- |
| Ex. 3 | 150° to 230° C. | 0 to −130 V | 1 to 2 μm |
| Ex. 4 | 150° to 240° C. | 0 to −50 V | 1 to 2 μm |
| Com. Ex. 3 | 160° to 210° C. | 0 to −50 V | 12 μm |
| Com. Ex. 4 | 150° to 200° C. | 0 to −50 V | 2 to 3 μm |

The fluorine-containing resin molded article of the present invention is excellent in antistatic property, mold-releasing property and non-tackiness because of its very low surface energy and its electric conductivity.

The process of the present invention is widely applicable, since the gas-phase treatment is carried out after molding to a desired shape, which does not restrict shape of molded articles.

According to the fixing roller of the present invention, the hot-offset and the electrostatic-offset scarcely occur. Further, since there is no process step where a composition containing a carbon fluorine is molded, it is possible to make the offset-preventing layer thinner and more uniform, and also the cold-offset may not occur. In addition, since the surface lubrication is good, the abrasion resistance becomes excellent, which makes its life longer.

INDUSTRIAL APPLICABILITY

The fluorine-containing resin molded article of the present invention is usable for rollers of an electrostatic copying machine such as a fixing roller, a transferring roller, a paper feeding roller and a conveying roller; bearings thereof. Further the molded article can be applied for various uses, e.g. a reservoir or tray for chemicals used in semiconductor preparation process, a casing for conveying or keeping wafers and electronic parts such as IC, a heating element, an electromagnetic wave shielding material, and the like.

What is claimed is:

1. A process for preparing the fluorine-containing resin molded article, which comprises preparing a molded article of fluorine-containing resin composition containing 0.1 to 30% by weight of a carbon material, oxidizing a surface of the molded article, and then fluorinating the surface of the article by bringing a reaction gas which comprises a compound containing fluorine atom into contact with the surface of the molded article.

2. The process for preparing the fluorine-containing resin molded article of claim 1, wherein the fluorine-containing resin is at least one selected from the group consisting of polytetrafluoroethylene, a copolymer of tetrafluoroethylene with at least one of other copolymerizable ethylenically unsaturated compound monomers, polychlorotrifluoroethylene and poly(vinylidene fluoride).

3. The process for preparing the fluorine-containing resin molded article of claim 1, wherein the article is in the form of rod, block plate, cup, cylinder, sheet or film.

4. The process for preparing the fluorine-containing resin molded article according to claim 1, wherein the fluorinating of the surface is carried out at a temperature of from 100° C. to 250° C. with a reaction gas selected from the group consisting of a compound containing fluorine atom and a mixed gas of the compound containing fluorine atom and an inert gas.

5. A process for preparing a fixing roller for an electrostatic copying machine, which comprises, forming a fluorine-containing resin composition containing 0.1 to 30% by weight of a carbon material in the form of sheet or film on an outer surface of a metal roller, and fluorinating the surface with a reaction gas which comprises a compound containing fluorine atom.

* * * * *